United States Patent [19]
Long et al.

[11] Patent Number: 5,848,585
[45] Date of Patent: Dec. 15, 1998

[54] PORTABLE SPACE HEATER

[75] Inventors: Norris R. Long; Clyde R. Schulte, both of Witchita, Kans.

[73] Assignee: The Coleman Company, Inc., Witchita, Kans.

[21] Appl. No.: 595,636

[22] Filed: Feb. 2, 1996

[51] Int. Cl.⁶ ........................................... F24H 3/02
[52] U.S. Cl. .................... 126/110 B; 251/251; 431/353; 431/183; 431/354
[58] Field of Search .......................... 126/110 B, 110 C; 431/181, 182, 183, 187, 354, 355, 350, 353; 251/151, 267, 900

[56] References Cited

U.S. PATENT DOCUMENTS

| | | | |
|---|---|---|---|
| 1,086,715 | 2/1914 | Irish | 431/183 |
| 2,565,457 | 8/1951 | Spender | 251/251 |
| 3,645,512 | 2/1972 | Dent et al. | 126/110 C |
| 3,706,446 | 12/1972 | Briggs . | |
| 3,720,496 | 3/1973 | Briggs . | |
| 4,015,631 | 4/1977 | Hayes | 251/900 |
| 4,081,238 | 3/1978 | Briggs et al. . | |
| 4,089,642 | 5/1978 | Briggs et al. . | |
| 4,201,544 | 5/1980 | Briggs et al. . | |
| 4,244,349 | 1/1981 | Valie et al. . | |
| 4,313,417 | 2/1982 | Briggs et al. . | |
| 4,443,187 | 4/1984 | Shaftner et al. . | |
| 4,532,914 | 8/1985 | Thomas et al. . | |
| 4,848,313 | 7/1989 | Vekie | 431/350 |
| 5,379,750 | 1/1995 | Larsen et al. | 431/354 |

FOREIGN PATENT DOCUMENTS 1418974  10/1964  France ..................................... 431/350

*Primary Examiner*—Carl D. Price
*Attorney, Agent, or Firm*—Fitzpatrick, Cella, Harper & Scinto

[57] ABSTRACT

A portable forced air heater includes a base, an outer tubular housing mounted on the base which includes front and rear ends, and a burner assembly mounted within the outer housing. The burner assembly includes an inner housing, and support brackets on the inner housing include tabs which extend through slots in the outer housing. A fan is mounted within the outer housing behind the inner housing. The outer housing is provided with an air opening rearwardly of the inner housing, and an air scoop below the air opening guides air from the fan toward the front of the outer housing for cooling the support surface of the heater. An air diffuser plate on the rear end-of the inner housing is provided with radially extending tapered slots which include radially outwardly diverging side edges. The diffuser plate includes a vane for each slot which partially obstructs the slot. A fuel valve is mounted on the base, and a fuel tube extends between the fuel valve and the burner assembly. A replaceable bushing is mounted on the fuel valve for controlling air flow into the fuel tube between the fuel tube and the bushing. Fuel flow through the housing of the fuel valve is varied by a valve body which is reciprocally mounted in a fuel passage in the valve housing. In one position of the valve body fuel can flow only through an opening in the valve body.

48 Claims, 8 Drawing Sheets

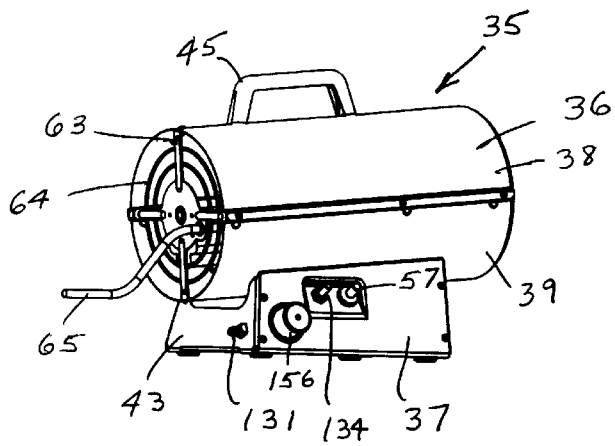
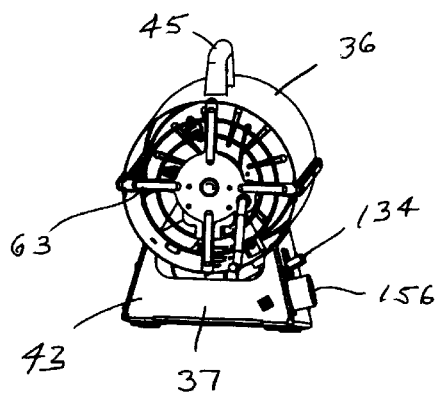
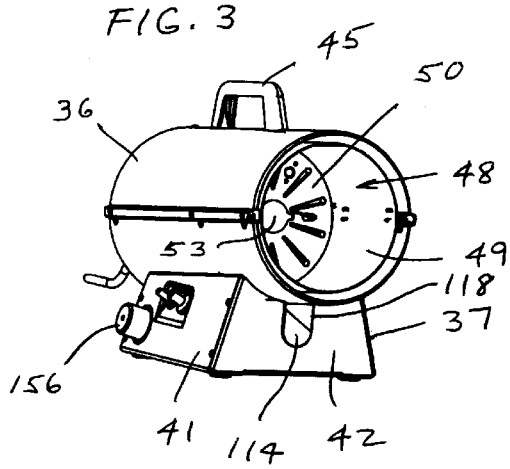
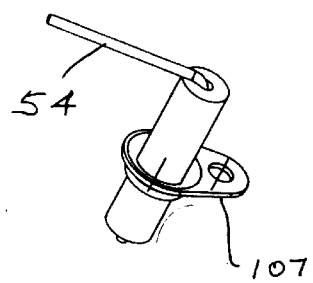
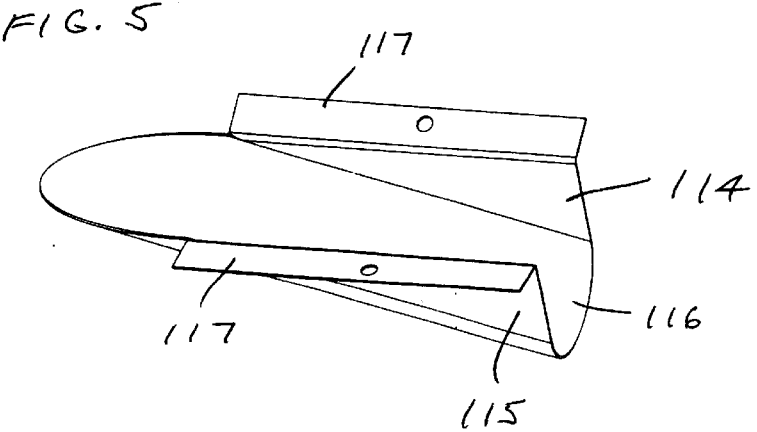

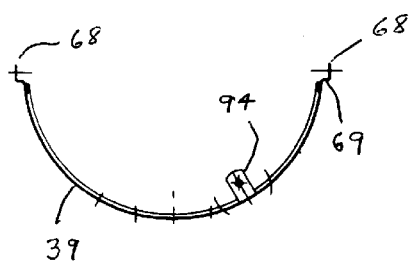
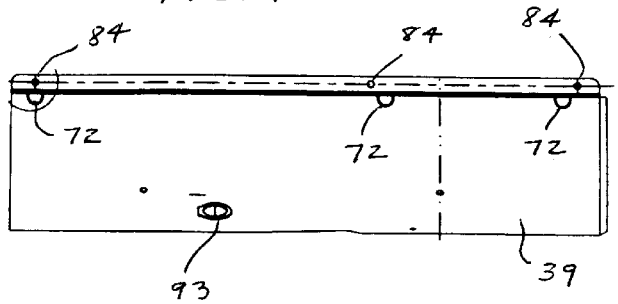
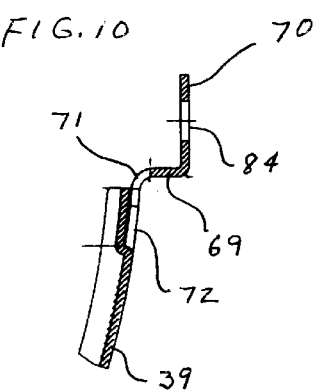
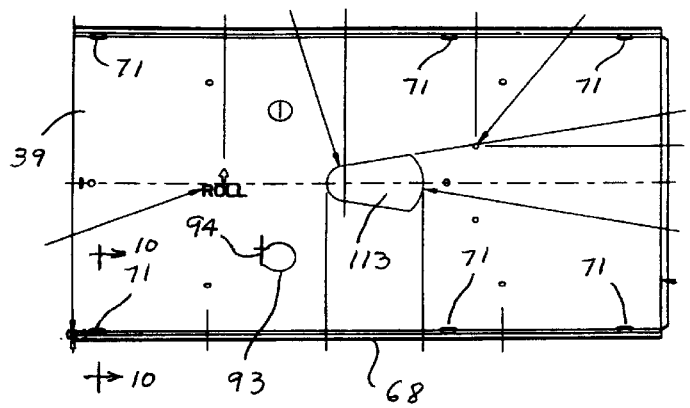
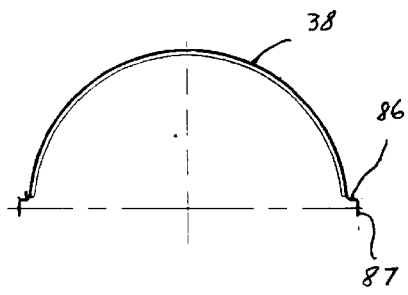
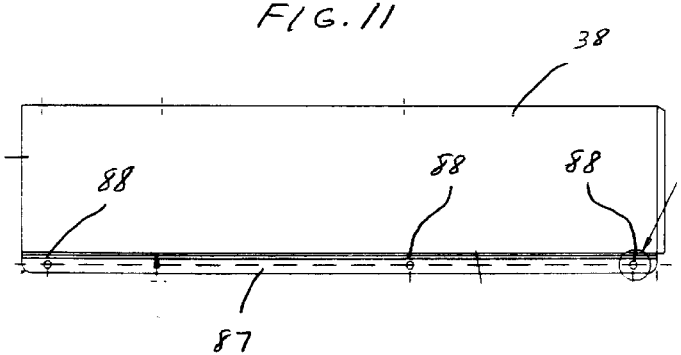

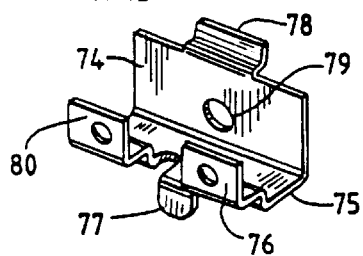
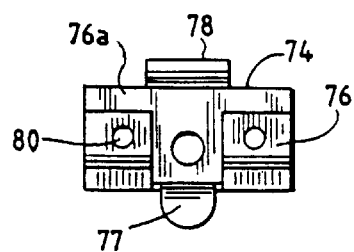
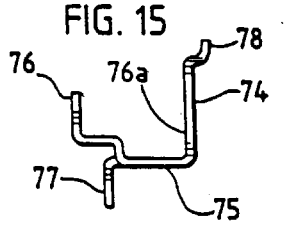
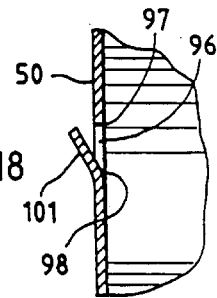
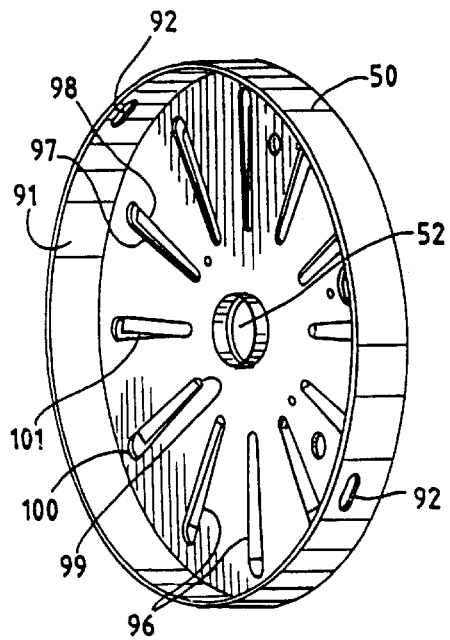
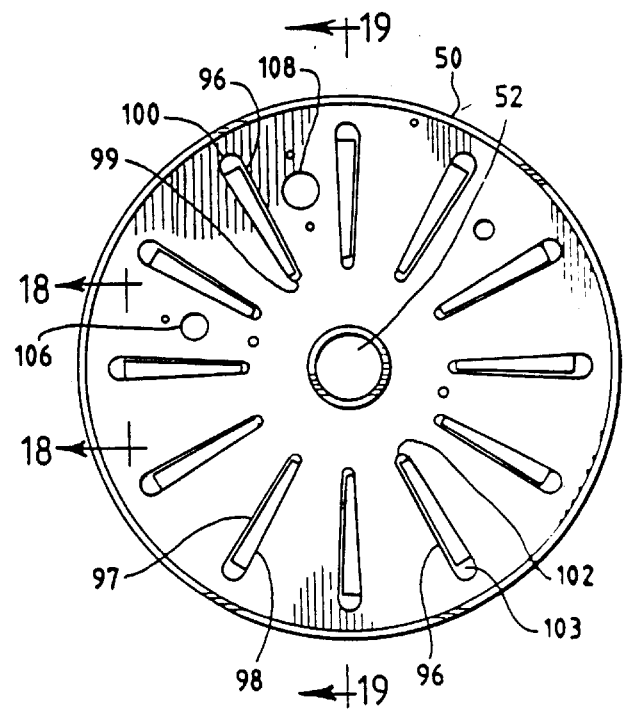

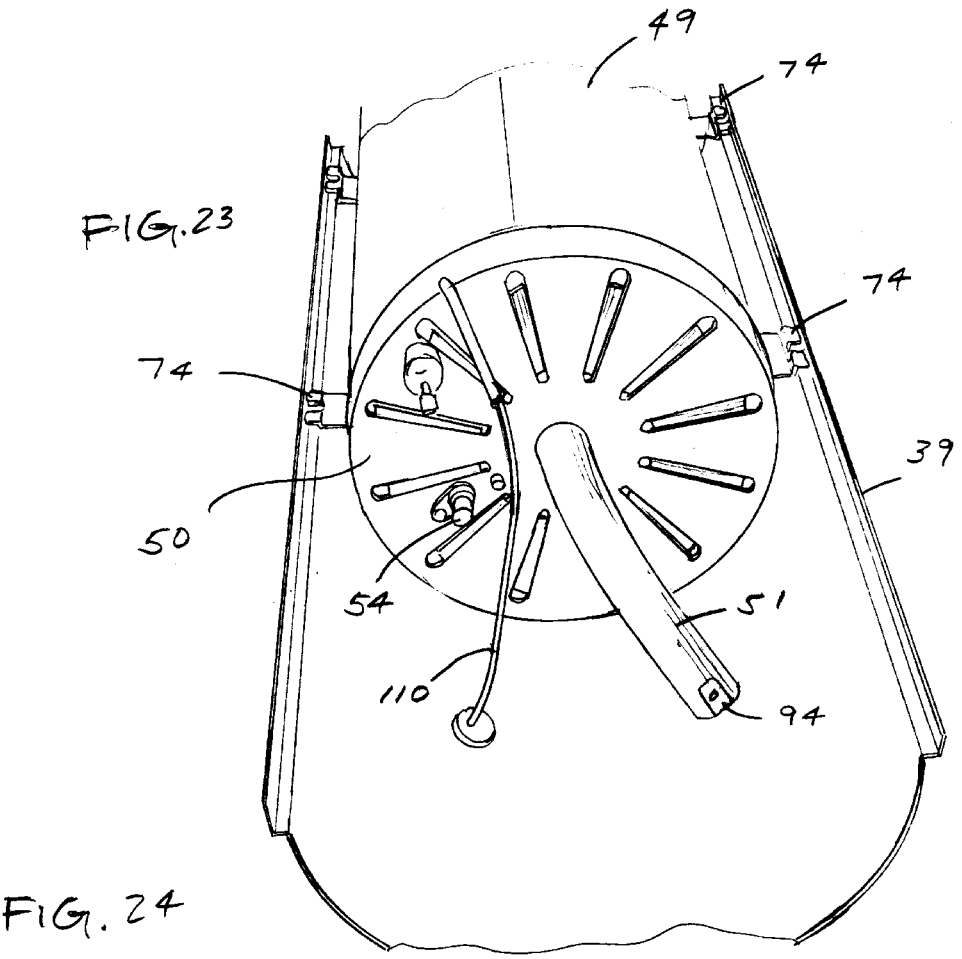

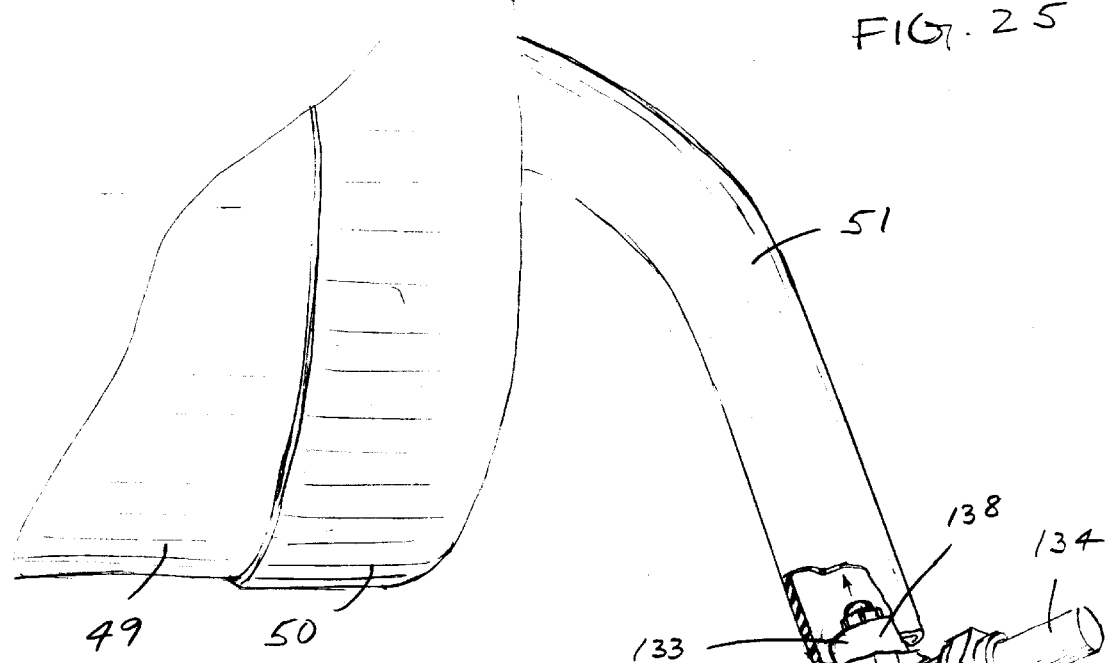
FIG. 25
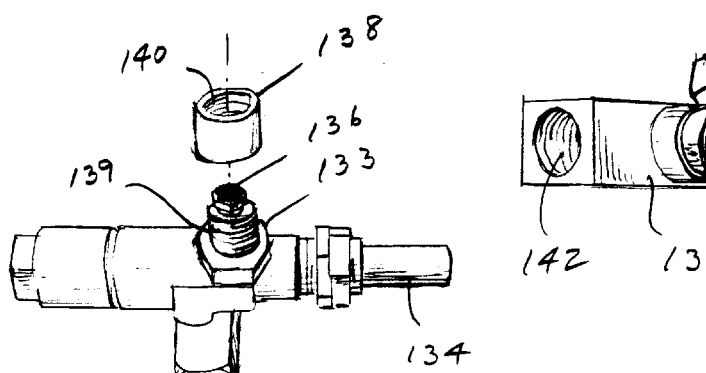
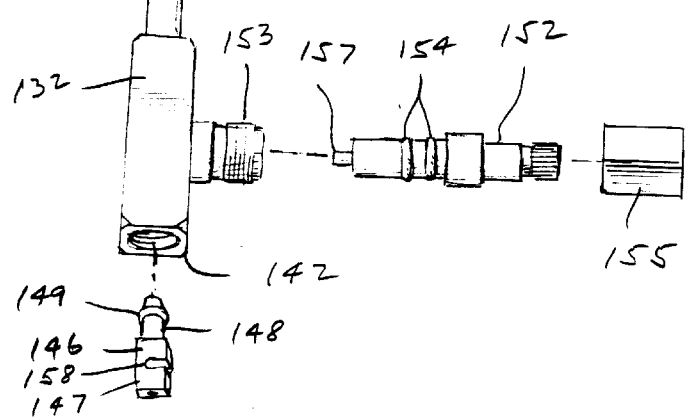
FIG. 26

PORTABLE SPACE HEATER

BACKGROUND AND SUMMARY OF THE INVENTION

This invention relates to portable space heaters, and, more particularly, to portable heaters of the forced air type.

Forced air heaters conventionally include an outer tubular housing, a burner assembly mounted within the outer housing, and an air blower within the outer housing behind the burner assembly. Fuel is conveyed to the burner assembly, and the blower supplies combustion air to the burner assembly, forces hot combustion gases from the burner assembly, and cools the exterior of the burner assembly.

The invention provides several improvements for portable space heaters. When the burner assembly is mounted in the outer housing the burner assembly should be properly aligned with the outer housing. Support brackets on the burner assembly drop into slots in the outer housing to ensure proper alignment. The two shells which form the outer housing are secured by sheet metal screws which threadedly engage the brackets. The bottom of the outer housing has an opening behind the burner assembly, and an air scoop is mounted below the opening. The air blower forces cool air through the opening, and the air scoop directs the air toward the support surface for the heater and toward the front end of the heater.

Fuel and primary combustion air are supplied to the burner assembly by a fuel tube. The inlet end of the fuel tube surrounds a cylindrical bushing on an outlet portion of a fuel valve. The inlet end of the fuel tube is spaced outwardly from the bushing so that primary combustion air can be aspirated into the fuel tube as the fuel flows from the valve into the tube. The amount of air flow can be adjusted for heaters of different heat capacities by changing the size of the bushing, which is threadedly engaged with the valve housing.

The fuel valve adjusts fuel flow to provide two different heat outputs from the heater. The valve is adjusted by a knob which is mounted on a stem which is rotatably mounted in the valve housing. A pin is eccentrically mounted on the inner end of the stem, and the pin is positioned in a slot in a valve body which is reciprocably mounted in a fuel passage in the valve housing. The eccentric pin acts as a crank to reciprocate the valve body between two positions for adjusting fuel flow.

The outlet end of the fuel tube extends through the center of a diffuser plate on the rear of the burner assembly. The diffuser plate is provided with a plurality of radially outwardly extending slots, and each of the slots has tapered side edges which diverge outwardly from a narrow inner end to a wider outer end. A generally triangular vane for each slot is formed by punching or deforming the diffuser plate to provide the slot, and the vane extends from one of the side edges of the slot out of the plane of the plate. The outer portions of the tapered slots allow relatively high air flow for cooling the outer wall of the combustion chamber. The inner portions of the slots allow the proper amount of secondary combustion air for the combustion process. The diffuser plate can be adjusted for heaters of different heat capacities by changing the angle of the vanes.

DESCRIPTION OF THE DRAWINGS

The invention will be explained in conjunction with an illustrative embodiment shown in the accompanying drawings, in which FIG. 1 is a right side perspective view of a heater formed in accordance with the invention;

FIG. 2 is a rear perspective view of the heater;

FIG. 3 is a front perspective view of the heater;

FIG. 4 is a perspective view of the ignition electrode;

FIG. 5 is a perspective view of the air scoop;

FIG. 7 is a right side elevational view of the lower shell of the outer housing;

FIG. 8 is a rear view of the lower shell;

FIG. 9 is a top plan view of the lower shell;

FIG. 10 is an enlarged fragmentary sectional view taken along the line 10—10 of FIG. 9;

FIG. 11 is a right side elevational view of the upper shell of the outer housing;

FIG. 12 is a rear view of the upper shell;

FIG. 13 is a perspective view of one of the support brackets;

FIG. 14 is a front view of the support bracket;

FIG. 15 is a side view of the support bracket;

FIG. 16 is a front perspective view of the air diffuser plate;

FIG. 17 is a rear view of the air diffuser plate;

FIG. 18 is an enlarged fragmentary sectional view taken along the line 18—18 of FIG. 17;

FIG. 23 is a rear perspective view of the lower shell and the burner assembly;

FIG. 24 is a top perspective view of the base;

FIG. 25 is a perspective view of the fuel control valve and fuel tube;

FIG. 26 is an exploded perspective view of the fuel control valve;

DESCRIPTION OF SPECIFIC EMBODIMENT

General Description

Figure 6:
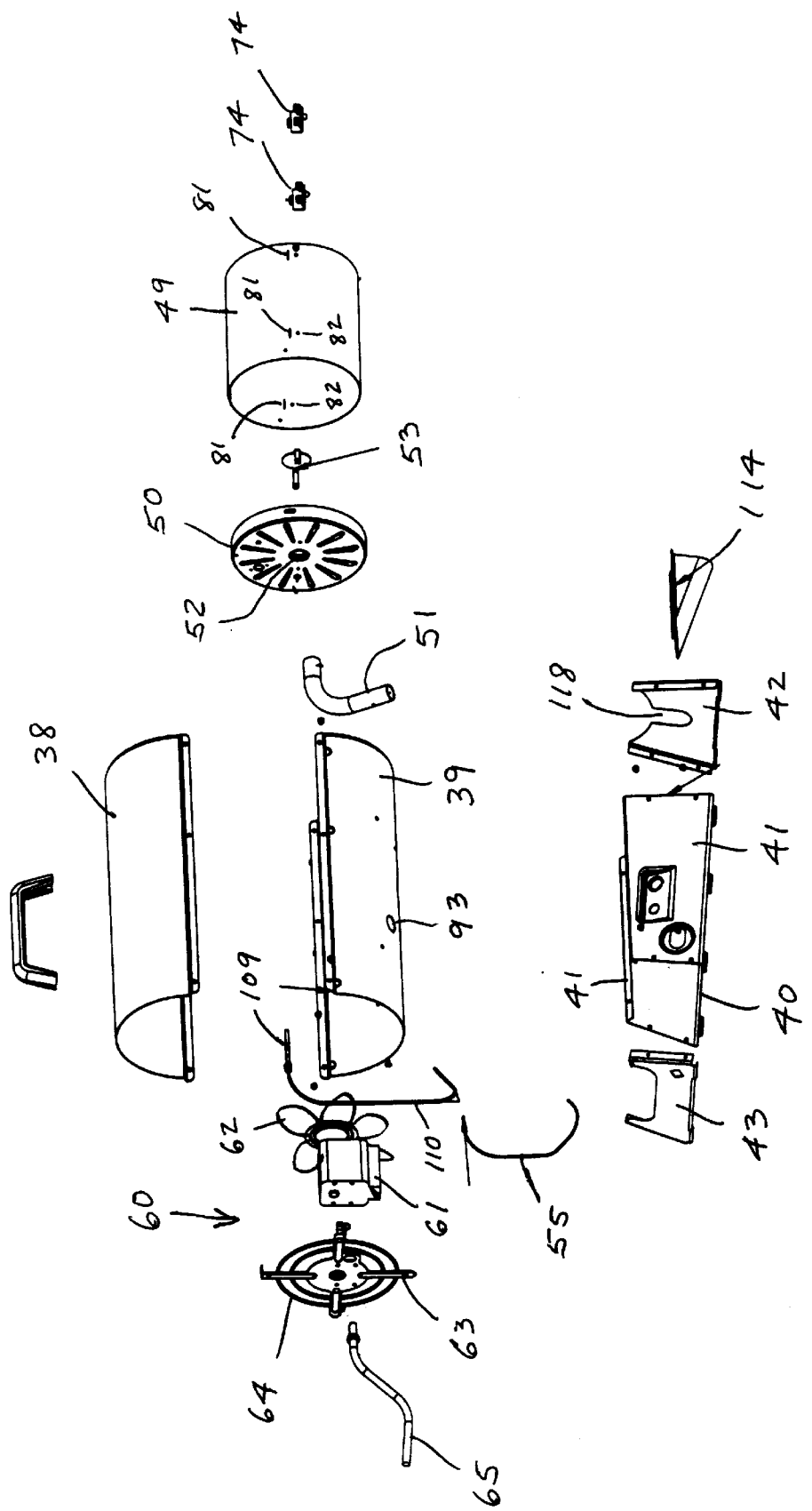
FIG. 6 is an exploded perspective view of the heater.
Figure 19:
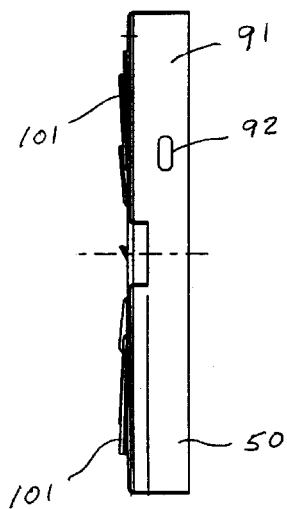
FIG. 19 is a sectional view taken along the line 19—19 of FIG. 17.

Referring to FIGS. 1–3 and 6, a portable forced air heater 35 includes an outer cylindrical metal housing 36 which is mounted on a base 37. The housing is formed from upper and lower semi-cylindrical shells 38 and 39.

The base includes a bottom wall 40, a pair of side walls 41, and front and rear walls 42 and 43. The base is adapted to rest on a flat supporting surface, and the front end 44 of the outer housing is angled upwardly from the supporting surface. The heater can be carried by a handle 45 which is attached to the outer housing.

A burner assembly 48 is mounted within the outer housing 36. The burner assembly includes an inner tubular metal shell 49 which provides a combustion chamber and a circular air diffuser plate 50 which is mounted on the rear end of the shell 49. Fuel is supplied to the combustion chamber by a fuel tube 51 (FIG. 4) which extends through a central opening 52 in the diffuser plate. A flame spreader or deflector 53 (see also FIG. 21) is mounted on the diffuser plate in front of the outlet end of the fuel tube.

When the heater is started, fuel which flows into the combustion chamber is ignited by a spark from an electrode 54 (FIG. 4) which is mounted on the air diffuser plate. The electrode is connected by a wire 55 to a conventional piezoelectric spark generator 56 (FIG. 24) which is mounted on the base. The piezoelectric generator is operated by a pushbutton 57 which extends from one side of the base.

Figure 22:
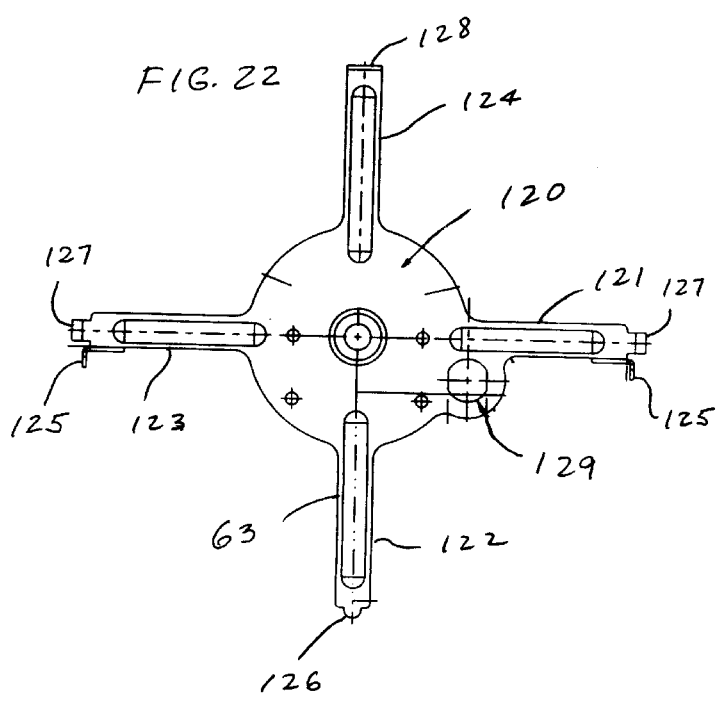
FIG. 22 is a rear view of the fan support bracket.

An air blower assembly 60 is mounted on the rear portion of the outer housing behind the burner assembly. The air blower assembly includes an electric motor 61 and a fan 62. The motor is mounted on a cruciform-shaped bracket 63 (see also FIG. 22), which is mounted in the outer housing. A protective wire grate 64 is attached to the bracket. An electric power cord 65 extends from the motor 61 and includes a conventional plug (not shown) for connecting to a power outlet.

The inner shell 49 of the burner assembly is mounted concentrically within the outer housing 36, and the fan blows cooling air through the annular space between the two shells. The fan also blows secondary combustion air through openings in the air diffuser plate into the combustion chamber.

Support Brackets

Referring now to FIGS. 7–9, the lower shell 39 of the outer housing includes a pair of axially extending side edges 68. Each of the side edges is generally L-shaped in transverse cross section and includes a laterally outwardly extending shoulder 69 and an upwardly extending outer flange 70. Three slots (FIGS. 9 and 10) are provided through the shoulder on each side of the shell, and the cylindrical wall of the shell is provided with an inwardly extending embossment 72 (FIGS. 7 and 10) below each slot.

A pair of support brackets 74 (FIGS. 6 and 13–15) are mounted on each side of the inner shell 49. Each support bracket is generally channel-shaped and includes a base 75, an inner wall 76a, and a pair of L-shaped tabs 76. A prong 77 extends downwardly from the base between the tabs 76. Another L-shaped tab 78 extends from the inner wall 76a. A screw opening 79 is provided in the inner wall below the tab 78, and a screw opening 80 is provided in each of the tabs 76.

The support brackets are attached to the inner shell 49 by inserting the tab 78 through a slot 81 (FIG. 6) in the shell, inserting a sheet metal screw through the opening 79, and threading the screw into a smaller opening 82 in the shell.

The prong 77 of the support bracket is sized to fit through a slot 71 in the lower shell 39 and into the embossment 72. The support brackets are mounted on the inner shell 49 so that the spacing between the prongs 77 on each side of the shell corresponds to the spacing between the slots 71 in the front half of the lower shell 39. The inner shell is simply dropped into position in the lower shell by inserting the prongs into the slots, and the proper alignment of the shells is assured. The size of the spacing between the shells is set by the width of the base 75 of the brackets.

When the support brackets are inserted into the slots, the outwardly extending base portions (FIG. 15) of the tabs 76 are supported by the shoulder 69 on each side of the lower shell. A screw opening 80 in one of the tabs is aligned with a slightly larger opening 84 (FIG. 10) in the flange 70 of the shell.

The side edges of the upper shell 38 have an L-shaped cross section similar to the lower shell 39, each side including a laterally outwardly extending shoulder 86 (FIG. 12) and a downwardly extending flange 87. The flange is provided with openings 87 which are aligned with the openings 84 in the flanges of the lower shell.

When the upper shell is mounted on the lower shell, the shoulders 86 of the upper shell are supported by the flanges 70 of the lower shell, and the flanges 82 of the upper shell extend downwardly alongside the outer surface of the lower flanges 70. The upper and lower shells are secured together by inserting sheet metal screws through the aligned openings 88 and 84 and into one of the screw openings 80 of the support bracket. The openings 80 are smaller than the screws, and the screws threadedly engage the support bracket as they are screwed into the openings. The brackets thereby act as nuts for holding the screws.

Air Diffuser Plate

After the inner shell 49 is mounted in the lower shell 39, the air diffuser plate 50 is attached to the rear end of the inner shell. The air diffuser plate includes a cylindrical flange 91 (FIG. 16) which fits over the cylindrical shell and is secured by sheet metal screws which are inserted through openings 92 in the flange and screwed into the shell.

The outlet end of the fuel tube 51 extends axially through the central opening 52 of the air diffuser plate, and the fuel tube makes a 90° turn so that the inlet end of the tube can be inserted through an opening 93 (FIGS. 6, 7, and 9) in the lower shell 39. The inlet end of the tube is secured by a screw to a tab 94 (FIG. 8) which extends upwardly from the edge of the opening 93.

Figure 20:
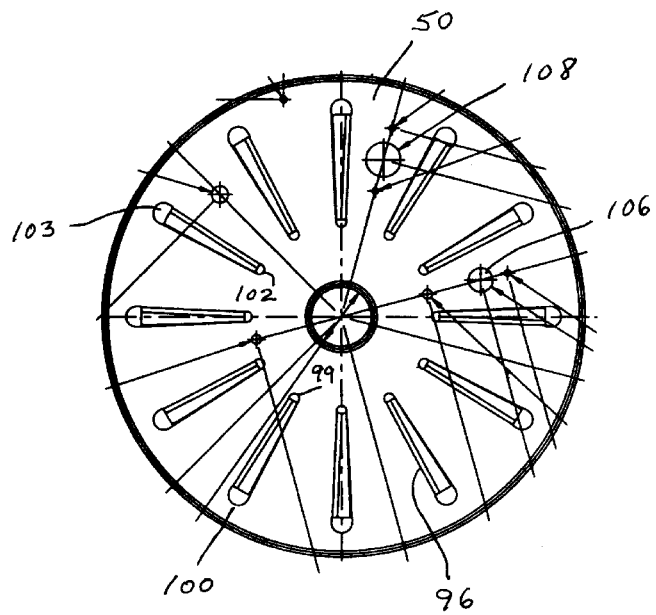
FIG. 20 is a front view of the air diffuser plate.

The air diffuser plate is provided with a plurality of slots 96 (FIGS. 16, 17, and 20) which extend radially outwardly from the center opening 52. Each slot is tapered and is defined by a pair of radially outwardly diverging side edges 97 and 98 which provide the slot with a narrow inner end 99 and a wider outer end 100.

A generally triangular vane 101 extends from the side edge 98 rearwardly from the plane of the air diffuser plate (see FIG. 18). The vanes are advantageously formed by punching or deforming the diffuser plate to form both the vanes and the slots. Each vane terminates short of the inner and outer ends of the slots to provide the slot with end portions 102 and 103 which are not obstructed by the vane.

Air from the fan 62 is forced through the slots in the air diffuser plate into the combustion chamber. The outer portion of each slot admits air at a relatively high flow rate for cooling the cylindrical wall of the inner shell 49. The inner portion of each slot admits a lower flow rate of secondary combustion air which is adequate to allow the combustion process to go to completion. Too much secondary combustion air results in a cool flame. Too little secondary combustion air causes incomplete combustion. The proper amount of secondary combustion air causes the chemical reaction to go to completion without a cooling effect. The radially extending vanes also swirls primary and secondary combustion air within the combustion chamber and causes good fuel/air mixing.

The pitch of the vanes relative to the plane of the air diffuser plate can be adjusted to provide the proper rate of air flow. If the vanes extend at a small angle relative to the plane of the diffuser plate, the slots are restricted and less air flows through the slots. If the angle of the vanes is increased, the air flow increases. Slots without vanes cannot be adjusted, and improper air flow can result in ragged flame and noisy operation with high CO emissions.

The adjustability of the vanes permits the same air diffuser plate to be used with heaters of different heat capacity. The vanes are adjusted to provide the proper air flow. Using common components in different size heaters reduces manufacturing costs.

Figure 21:
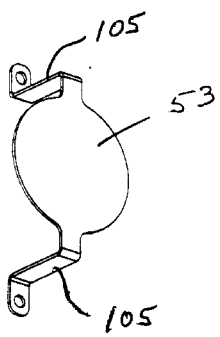
FIG. 21 is a perspective view of the fuel/air deflector plate.

The deflector plate 53 is mounted on the air diffuser plate in front of the outlet end of the fuel tube 51 by attaching legs 105 (FIG. 21). A combustible mixture of fuel and primary combustion air strikes the plate and is deflected radially outwardly. Burning begins radially around the deflector plate and continues to a short distance in front of and outside of the heater.

The air diffuser plate is provided with an opening 106 for the piezoelectric electrode 54 (FIG. 4), which is attached to the air diffuser plate by a mounting bracket 107. Another opening 108 in the air diffuser plate is for a thermocouple 109 (FIG. 6) which is connected by a wire 110 to a thermoelectric fuel valve 111 (FIG. 24) in the base.

Air Scoop

The bottom shell 39 is provided with an air outlet opening 113 (FIG. 9) behind the air diffuser plate 50. An air scoop 114 (FIGS. 5 and 6) is attached to the outside surface of the bottom shell below the opening. The air scoop includes side walls 115 and a concave bottom wall 116 which extends downwardly and forwardly. A pair of flanges 117 extend laterally outwardly from the side walls for attaching the scoop to the bottom shell. The front or outlet end of the air scoop is aligned with a U-shaped opening 118 (FIGS. 3 and 6) in the front wall of the base 37.

The fan 62 creates a high pressure zone behind the air diffuser plate 50 and is the annular space between the concentric walls of the outer housing 36 and inner shell 49. Air is forced downwardly through the outlet opening 113 in the bottom of the outer housing, and the air scoop guides the air downwardly and forwardly through the opening in the front of the base. Since the outlet opening 113 is positioned behind the burner assembly, the air which passes through the opening is not heated. The air scoop therefore directs cool air downwardly and forwardly over the supporting surface for the base and below the front end of the heater.

In order to comply with standards and to avoid ignition of combustible materials upon which the heater may rest, heaters of this type should not increase the temperature of the support surface more than 117° F. above ambient temperature. Some competitive heaters use a slot in the front of the lower shell to direct air toward the support surface. However, that air has been heated by the burner assembly and does not provide as much cooling as the air scoop.

The fan support bracket 63 includes a central plate 120 (FIG. 22) to which the fan motor 61 is attached and four arms 121–124 which extend outwardly from the central plate. Each of the laterally extending arms 121 and 123 includes a downwardly extending prong 125 which is similar to the prong 77 of the support brackets 74. Each prong 125 is inserted into the slot 71 and embossment 72 (FIGS. 7, 9, and 10) at the rear end of the lower shell 39 for properly positioning the fan.

The bottom arm terminates in a tab 126 which is inserted into a slot in the lower shell 39. The horizontal arms 121 and 123 terminate in right angle tabs 127. Screws which are inserted through the rear screw openings 88 and 84 in the upper and lower shells are threaded through openings in the tabs 127. The top arm 124 also terminates in a right angle tab 128 which is secured to the top of the upper shell. The power cord 65 extends through an opening 129 in the central plate 120.

Fuel Control Valve

The particular heater illustrated is powered by liquefied petroleum fuel such as propane. A fuel hose from a refillable propane tank is connected to an externally threaded fuel inlet fitting 131 (FIG. 1) which projects from the rear wall of the base 37. Referring to FIGS. 24–26, the fuel inlet fitting screws into a fuel valve housing 132 of a thermoelectric fuel control valve.

The fuel valve housing also includes a fuel outlet portion 133 and a pushbutton 134 which extends through the side of the base 37 and which manually opens the thermoelectric valve when the pushbutton is depressed. The thermoelectric valve is connected by the wire 110 to the thermocouple 109 (FIG. 6) which extends through the air diffuser plate into the combustion chamber. The thermoelectric valve portion of the fuel control valve portion is conventional. When the temperature of the thermocouple 109 is below a certain minimum temperature, the thermoelectric valve is closed. The heater is started by depressing the pushbutton 134 to open the valve to allow fuel to flow into the combustion chamber. The fuel is ignited by depressing the pushbutton 57 of the piezoelectric spark generator 56. When the thermocouple 109 is heated sufficiently, the thermoelectric valve remains open, and the pushbutton 134 can be released.

Referring to FIGS. 25 and 26, the inlet end of the fuel tube 51 surrounds the fuel outlet portion 133 of the fuel control valve. The fuel outlet portion is proivded with a fuel outlet orifice 136, and as fuel flows through the orifice 136 into the fuel tube 51, primary combustion air is aspirated into the fuel tube through the annular space between the fuel outlet portion 133 and the fuel tube 51. The fuel/air mixture is conveyed to the combustion chamber by the fuel tube.

The amount of primary combustion air which is aspirated into the fuel tube depends on the size of the annular space betwen the fuel tube and the outlet portion 133 of the fuel valve housing. Heaters with different heat capacities require different amounts of primary combustion air. Different size heaters may also use different size fuel orifices 136. As the diameter of the orifice decreases, the fuel pressure increases and the velocity of the fuel flow through the orifice also increases. The increased velocity aspirates more air into the fuel tube which changes the fuel/air ratio.

In order to save component costs, it is desirable to use the same fuel control valve and fuel tube for heaters of different capacities. This is accomplished by using a replaceable cylindrical bushing 138 as part of the fuel outlet portion 133 of the valve housing. The valve housing includes an externally threaded nipple 139 through which the fuel orifice 136 extends. The bushing 138 includes an internally threaded bore 140 which is screwed over the nipple 139.

Bushings with different outside diameters can be used with the same fuel valve housing and the same fuel tube. The proper flow rate of primary combustion air is obtained by selecting the size bushing which provides the appropriate size of the annular space between the bushing and the fuel tube.

Figure 27:
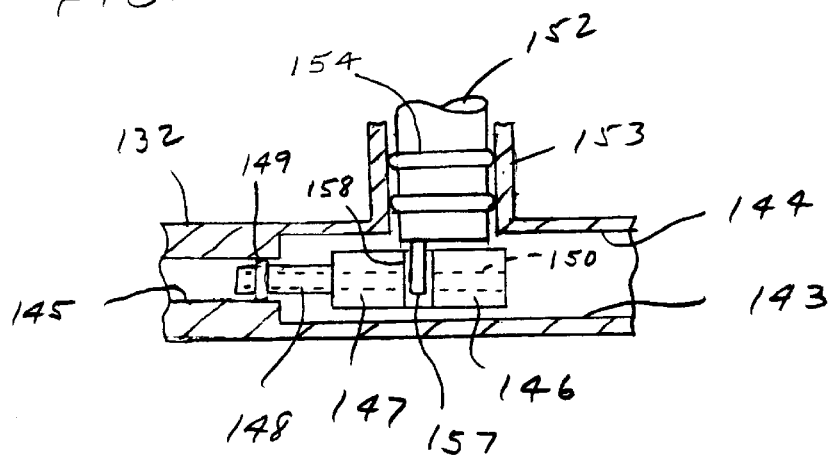
FIG. 27 is a fragmentary sectional view of the fuel control valve.
Figure 28:
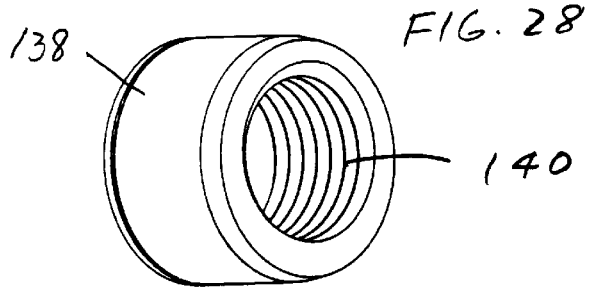
FIG. 28 is a perspective view of one of the bushings for the outlet portion of the fuel control valve.
Figure 29:
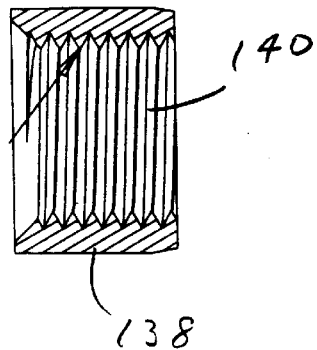
FIG. 29 is a sectional view of the bushing of FIG. 27.
Figure 30:
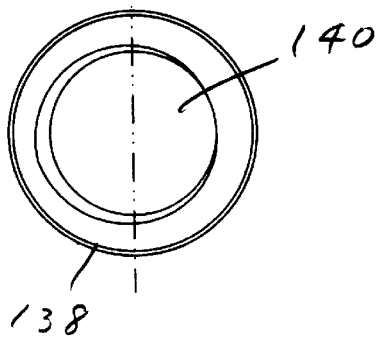
FIG. 30 is a front elevational view of the bushing.
Figure 31:
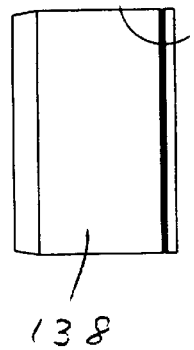
FIG. 31 is a side elevational view of the bushing.

The fuel control valve may also include means for controlling the flow rate of fuel through the valve. Referring to FIGS. 26 and 27, the valve housing includes an internally threaded inlet end portion 142 into which the inlet fitting 131 is screwed. A fuel passage 143 extends through the valve housing from the inlet end to the outlet orifice 136. The fuel passage includes a wide-diameter end portion 144 and a reduced-diameter portion 145. A valve body 146 is reciprocably mounted in the fuel passage for axial movement relative to the fuel passage.

The valve body includes a block portion 147 which has a generally rectangular cross section and a tubular portion 148. The tubular portion is sized to fit within the reduced-diameter portion 145 of the fuel passage, and an O-ring 149 on the tubular portion sealingly engages the wall of the reduced-diameter portion. A central bore 150 extends through the valve body.

The valve body is reciprocated within the valve housing by a stem 152 which is rotatably mounted in a bushing 153 which extends perpendicularly to the fuel passage 143. O-rings 154 on the stem sealingly engage the bushing, and the stem is held in place by an internally threaded cap 155 which is screwed onto the bushing. The outer end of the stem extends through the side wall of the base and is rotated by a knob 156 (FIGS. 1–3).

A pin 157 on the inner end of the rotary stem is eccentrically mounted relative to the axis of rotation of the stem. The pin is positioned in a transverse slot 158 in the block portion of the valve body. When the rotary stem is rotated 180°, the eccentric pin 157 acts as a crank to reciprocate the valve body between two positions within the fuel passage. In one position (FIG. 27) the O-ring 149 on the tubular portion 148 of the valve body is positioned within the reduced-diameter portion 145 of the fuel passage. In that position fuel can flow only through the internal bore 150 of the valve body. In the second position, the O-ring 149 on the tubular portion is withdrawn from the reduced-diameter passage 145, and fuel can flow around the block portion 147 and the O-ring 149 as well as through the internal bore 150.

The lower rate of fuel flow when the valve block is in the first position provides a first heat rating, for example, 50,000 Btu, and the higher rate of fuel flow when the valve block is in the second position provides a higher heat rating, for example, 80,000 Btu.

While in the foregoing specification a detailed description of a specific embodiment of the invention was set forth for the purpose of illustration, it will be understood that many of the details herein given may be varied considerably by those skilled in the art without departing from the spirit and scope of the invention.

We claim:

1. A heater comprising:

a base, an outer tubular housing mounted on the base, the outer housing including a lower housing portion mounted on the base and an upper housing portion mounted on the lower housing portion, the lower housing including a pair of axially extending sides, which includes an outwardly extending shoulder and an upwardly extending outer flange and which are provided with axially spaced slots, and a burner assembly mounted within the outer housing, the burner assembly including an inner housing, each of the support brackets including a projection which extends into one of the slots in the sides of the lower housing.

2. The heater of claim 1 in which each of the side of the lower housing is generally L-shaped in transverse cross section and each of the support brackets includes a shoulder portion which is supported by the shoulder of one of the sides of the lower housing.

3. The heater of claim 2 in which the upper housing includes a pair of axially extending sides which are generally L-shaped in transverse cross section and includes an outwardly extending shoulder and a downwardly extending flange, and shoulders of the upper housing being supported by the flanges of the lower housing and the flanges of the upper housing extending alongside of the flanges of the lower housing.

4. The heater of claim 3 in which the flanges of the upper and lower housings and the support brackets include aligned openings, and fasteners extending through the aligned openings.

5. The heater of claim 4 in which the fasteners are screws which are threadedly engaged with the support brackets.

6. The heater of claim 3 in which each of the support brackets includes a pair of upwardly extending tabs which extend upwardly from the shoulder portion of the bracket, each of the tabs having an opening which is aligned with openings in the flanges of the upper and lower housings, and screws extending through the aligned openings and being threadedly engaged with the tabs.

7. The heater of claim 2 in which the upper and lower housings and the support brackets include aligned openings, and fasteners extending through the aligned openings.

8. The heater of claim 2 in which each of the support brackets includes a downwardly extending prong which extends through a slot in the lower housing.

9. The heater of claim 8 in which each of the slots in the lower housing is located at the intersection of the shoulder and flange of the lower housing.

10. The heater of claim 2 including a fan assembly comprising a fan and a fan support, the fan support including support arms which are supported by the shoulders on the sides of the lower housing, each of the support arms including a downwardly extending prong which extends through a slot in the lower housing.

11. The heater of claim 10 in which each of the slots in the lower housing is located at the intersection of the shoulder and flange of the lower housing.

12. A heater comprising:

a base, an outer tubular housing mounted on said base, said outer tubular housing including a lower housing portion mounted on said base and an upper housing portion mounted on said lower housing portion, and a burner assembly mounted within the outer housing, said burner assembly including an inner housing, wherein the outer tubular housing includes a rear end and a forward end and the inner housing includes a rear end and a forward end, the rear end of the inner housing being positioned forwardly of the rear end of the outer housing, the outer housing having a bottom opening adjacent the base and rearwardly of the rear end of the inner housing, and blower means mounted in the outer housing behind the inner housing for blowing air into the inner housing and for blowing air through the bottom opening in the outer housing.

13. The heater of claim 12 including air guide means below the bottom opening of the outer housing for guiding air from the bottom opening toward the forward end of the outer housing.

14. The heater of claim 13 in which the base includes a pair of side walls and a front wall, the front wall having an opening for the air guide means.

15. The heater of claim 14 in which the guide means comprises an air scoop attached to the outer housing, the air scoop having a pair of side walls and a downwardly and forwardly extending bottom wall.

16. The heater of claim 15 in which the air scoop directs air toward a supporting surface for the base.

17. A heater comprising:

a base, an outer tubular housing mounted on said base, said outer tubular housing including a lower housing portion mounted on said base and an upper housing portion mounted on said lower housing portion, and a burner assembly mounted within the outer housing, said burner assembly including an inner housing, wherein the outer tubular housing includes a rear end and a forward end and the inner housing includes a rear end and a forward end, the rear end of the inner housing being positioned forwardly of the rear end of the outer housing, a generally planar diffuser plate mounted on the rear end of the inner housing, and blower means mounted in the outer housing behind the inner housing for blowing air through the diffuser plate, the diffuser plate having a central opening and a plurality of slots extending radially outwardly from the central opening, each of the plurality of slots having tapered side edges which extend between a narrow inner end and a wider outer end, and a vane for each of the plurality of slots which extends from one of the side edges of the slot out of the plane of the diffuser plate.

18. The heater of claim 17 in which the vane of each of the plurality of slots terminates short of the outer end of the slot to provide each of the plurality of slots with an unobstructed outer end portion.

19. The heater of claim 17 in which the vane of each of the plurality of slots terminates short of the inner end of the slot to provide the slot with an unobstructed inner end portion.

20. The heater of claim 17 in which the vanes extend rearwardly from the plane of the diffuser plate.

21. The heater of claim 17 in which each of the vanes is generally triangular and diverges from the narrow inner end of the associated slot to the larger outer end of the slot.

22. The heater of claim 17 including a fuel tube extending through the central opening of the diffuser plate and a deflector plate positioned forwardly of the fuel tube and attached to the diffuser plate.

23. A heater comprising:

a base, an outer tubular housing mounted on said base, said outer tubular housing including a lower housing portion mounted on said base and an upper housing portion mounted on said lower housing portion, a burner assembly mounted within the outer housing, said burner assembly including an inner housing, and a fuel valve housing mounted on said base, said fuel valve housing having a fuel outlet portion with a fuel outlet orifice, and a fuel tube extending between the fuel outlet portion of said valve housing and said burner assembly, said fuel tube having an inlet end which surrounds and is spaced from the fuel outlet portion of said valve housing whereby combustion air can flow into the inlet end between the fuel outlet portion and the inlet end.

24. The heater of claim 23 in which the fuel outlet portion of the valve housing includes a generally cylindrical bushing which is removably mounted on the valve housing whereby the space between the outlet portion of the valve housing and the inlet end of the fuel tube can be changed by changing the size of the bushing.

25. The heater of claim 24 in which the cylindrical bushing is threadedly engaged with the valve housing.

26. A heater comprising:

a base, an outer tubular housing mounted on said base, said outer tubular housing including a lower housing portion mounted on said base and an upper housing portion mounted on said lower housing portion, a burner assembly mounted within the outer housing, said burner assembly including an inner housing, and a fuel valve mounted on said base and a fuel tube extending between said fuel valve and said burner assembly, said fuel valve including a valve housing having a fuel inlet and a fuel outlet and a fuel passage extending between the fuel inlet and the fuel outlet, a valve body reciprocably mounted in the fuel passage for movement between first and second positions, said valve body having an opening therethrough, seal means within the fuel passage for engaging said valve housing and said valve body when said valve body is in the first position for preventing flow of the fuel around said valve body whereby fuel can flow through the fuel passage only by flowing through the opening in said valve body, said seal means being disengaged from one of said valve housing and said valve body when said valve body is in the second position whereby fuel can flow through the fuel passage by flowing around the valve body and through the opening in the valve body, and means for reciprocating said valve body between the first and second positions.

27. The heater of claim 26 in which said reciprocating means includes an elongated stem rotatably mounted in the valve housing for rotation about a longitudinal axis of the stem and a pin eccentrically mounted on the stem with respect to said longitudinal axis.

28. The heater of claim 27 in which said valve body is provided with a slot which extends generally perpendicularly to the direction of reciprocal movement of the valve body, the pin of the stem being positioned in said slot.

29. The heater of claim 26 in which the fuel passage includes a large-diameter portion adjacent the fuel inlet and a small-diameter portion between the large-diameter portion and the fuel outlet, the valve body including a large-diameter portion which is positioned in the large-diameter portion of the fuel passage and a small diameter portion, the small diameter portion of the valve body being positioned within the small-diameter portion of the fuel passage when the valve body is in its first position and the small-diameter portion of the valve body being positioned within the large-diameter portion of the fuel passage when the valve body is in its second position.

30. The heater of claim 29 in which said seal means is mounted on the small-diameter portion of the valve body.

31. The heater of claim 30 in which said seal means is an O-ring.

32. A heater comprising:

a base, an outer tubular housing mounted on the base and having a forward end, a rear end, a top and a bottom, a burner assembly mounted within the outer tubular housing, the burner assembly including an inner housing having a forward end and a rear end, the rear end of the inner housing being positioned forwardly of the rear end of the outer housing, the outer housing having a bottom opening adjacent the base and rearwardly of the rear end of the inner housing, and blower means mounted in the outer housing behind the inner housing for blowing air into the inner housing and for blow air through the bottom opening in the outer housing.

33. The heater of claim 32 including air guide means below the bottom opening of the outer housing for guiding air from the bottom opening toward the forward end of the outer housing.

34. The heater of claim 33 in which the guide means comprises an air scoop attached to the outer housing, the air scoop having a pair of side walls and a downwardly and forwardly extending bottom wall.

35. A heater comprising:

an outer tubular housing having a forward end and a rear end, a burner assembly mounted within the outer tubular housing, the burner assembly including an inner housing having a forward end and a rear end, the rear end of the inner housing being positioned forwardly of the rear end of the outer housing, a generally planar diffuser plate mounted on the rear end of the inner housing, and blower means mounted in the outer housing behind the inner housing for blowing air through the diffuser plate, the diffuser plate having a central opening and a plurality of slots extending radially outwardly from the central opening, each of the slots having tapered side edges which extend between a narrow inner end and a wider outer end, and a vane for each of the slots which extends from one of the side edges of the slot out of the plane of the diffuser plate.

36. The heater of claim 35 in which the vane of each slot terminates short of the outer end of the slot to provide the slot with an unobstructed outer end portion.

37. The heater of claim 35 in which the vane of each slot terminates short of the inner end of the slot to provide the slot with an unobstructed inner end portion.

38. The heater of claim 35 in which the vanes extend rearwardly from the plane of the diffuser plate.

39. The heater of claim 35 in which each of the vanes is generally triangular and diverges from the narrow inner end of the associated slot to the larger outer end of the slot.

40. The heater of claim 35 including a fuel tube extending through the central opening of the diffuser plate and a deflector plate positioned forwardly of the fuel tube and attached to the diffuser plate.

41. A heater comprising:

a base, an outer tubular housing having a forward end and a rear end, a burner assembly mounted within the outer housing, the burner assembly having an inner housing having a forward end and a rear end, a fuel valve housing mounted on the base, the fuel valve housing having a fuel outlet portion with a fuel outlet orifice, and a fuel tube extending between the fuel outlet portion of the valve housing and the burner assembly, the fuel tube having an inlet end which surrounds and is spaced from the fuel outlet portion of the valve housing whereby combustion air can flow into the inlet end between the fuel outlet portion and the inlet end, the fuel outlet portion of the valve housing including a generally cylindrical bushing which is removably mounted on the valve housing whereby the space between the outlet portion of the valve housing and the inlet end of the fuel tube can be changed by changing the size of the bushing.

42. The heater of claim 41 in which the cylindrical bushing is threadedly engaged with the valve housing.

43. A heater comprising:

a base, an outer tubular housing, a burner assembly mounted within the outer housing, a fuel valve mounted on the base, a fuel tube extending between the fuel valve and the burner assembly, the fuel valve including a valve housing having a fuel inlet and a fuel outlet and a fuel passage extending between the fuel inlet and the fuel outlet, a valve body reciprocally mounted in the fuel passage for movement between first and second positions, the valve body having an opening therethrough, seal means within the fuel passage for engaging the valve housing and the valve body when the valve body is in the first position for preventing flow of fuel around the valve body whereby fuel can flow through the fuel passage only by flowing through the opening in the valve body, the seal means being disengaged from one of the valve housing and the valve body when the valve body is in the second position whereby fuel can flow through the fuel passage by flowing around the valve body and through the opening in the valve body, and means for reciprocating the valve body between the first and second positions.

44. The heater of claim 43 in which said reciprocating means includes an elongated stem rotatably mounted in the valve housing for rotation about a longitudinal axis of the stem and a pin eccentrically mounted on the stem with respect to said longitudinal axis.

45. The heater of claim 44 in which said valve body is provided with a slot which extends generally perpendicularly to the direction of reciprocal movement of the valve body, the pin of the stem being positioned in said slot.

46. The heater of claim 43 in which the fuel passage includes a large-diameter portion adjacent the fuel inlet and a small-diameter portion between the large-diameter portion and the fuel outlet, the valve body including a large-diameter portion which is positioned in the large-diameter portion of the fuel passage and a small diameter portion, the small diameter portion of the valve body being positioned within the small-diameter portion of the fuel passage when the valve body is in the first position and the small-diameter portion of the valve body being positioned within the large-diameter portion of the fuel passage when the valve body is in the second position.

47. The heater of claim 46 in which said seal means is mounted on the small-diameter portion of the valve body.

48. The heater of claim 47 in which said seal means is an O-ring.

* * * * *